UNITED STATES PATENT OFFICE.

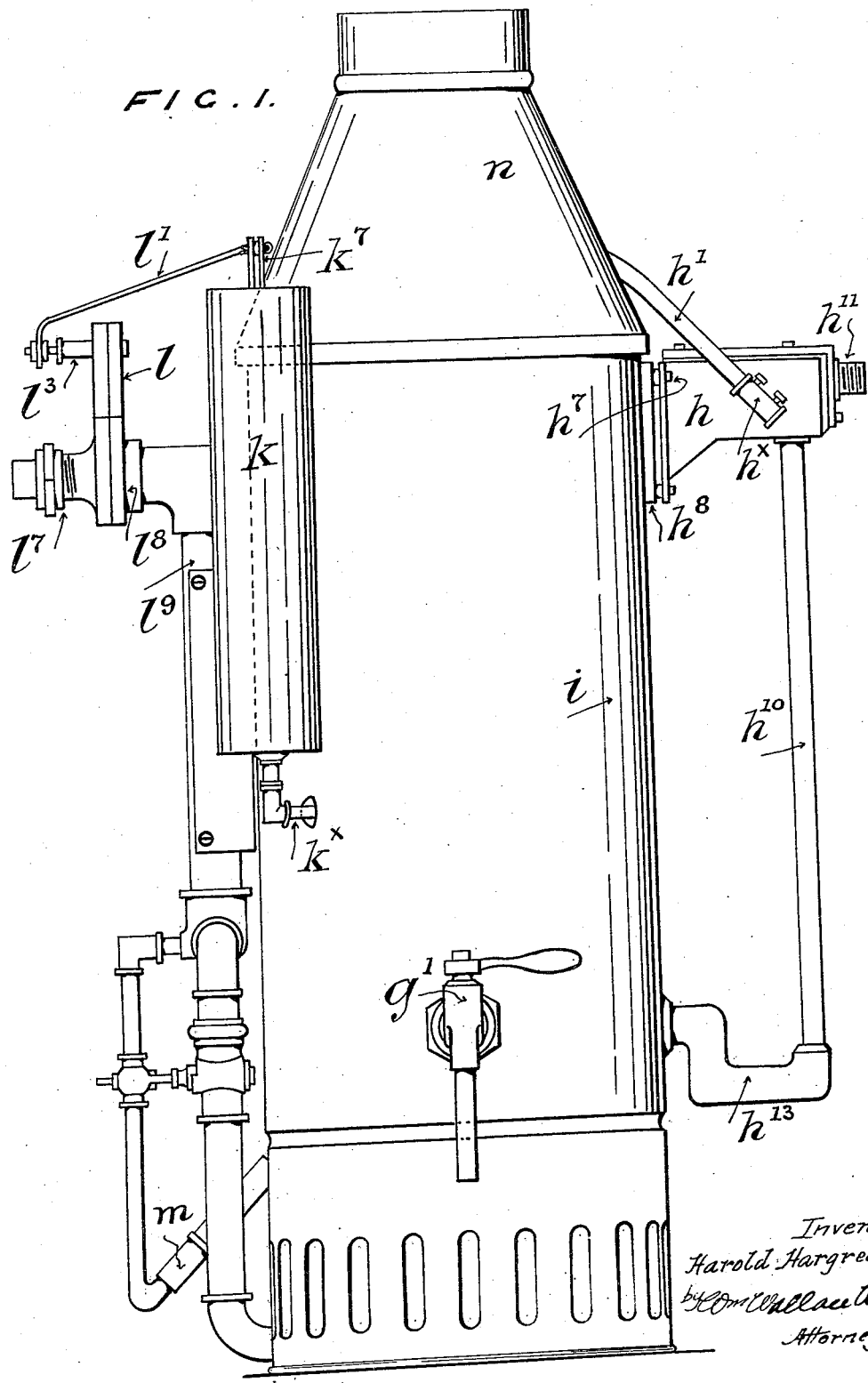

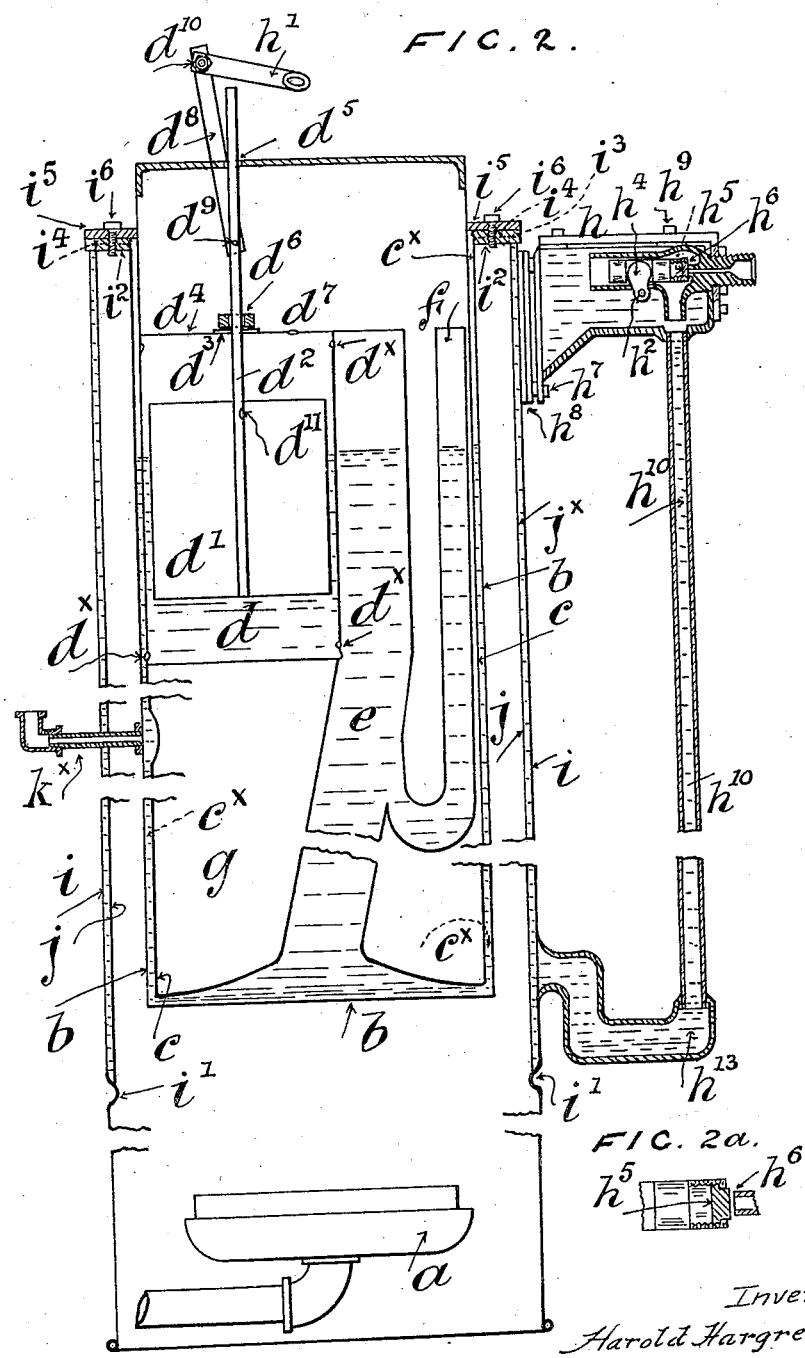

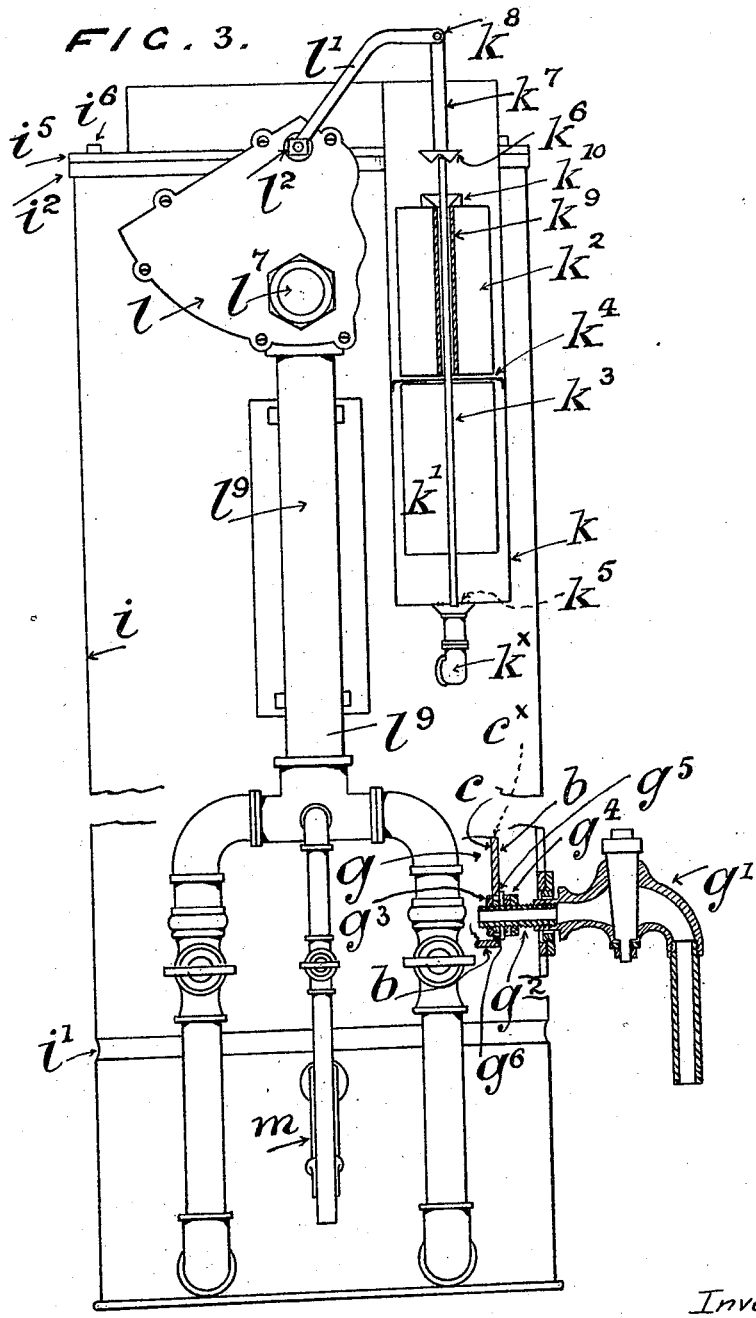

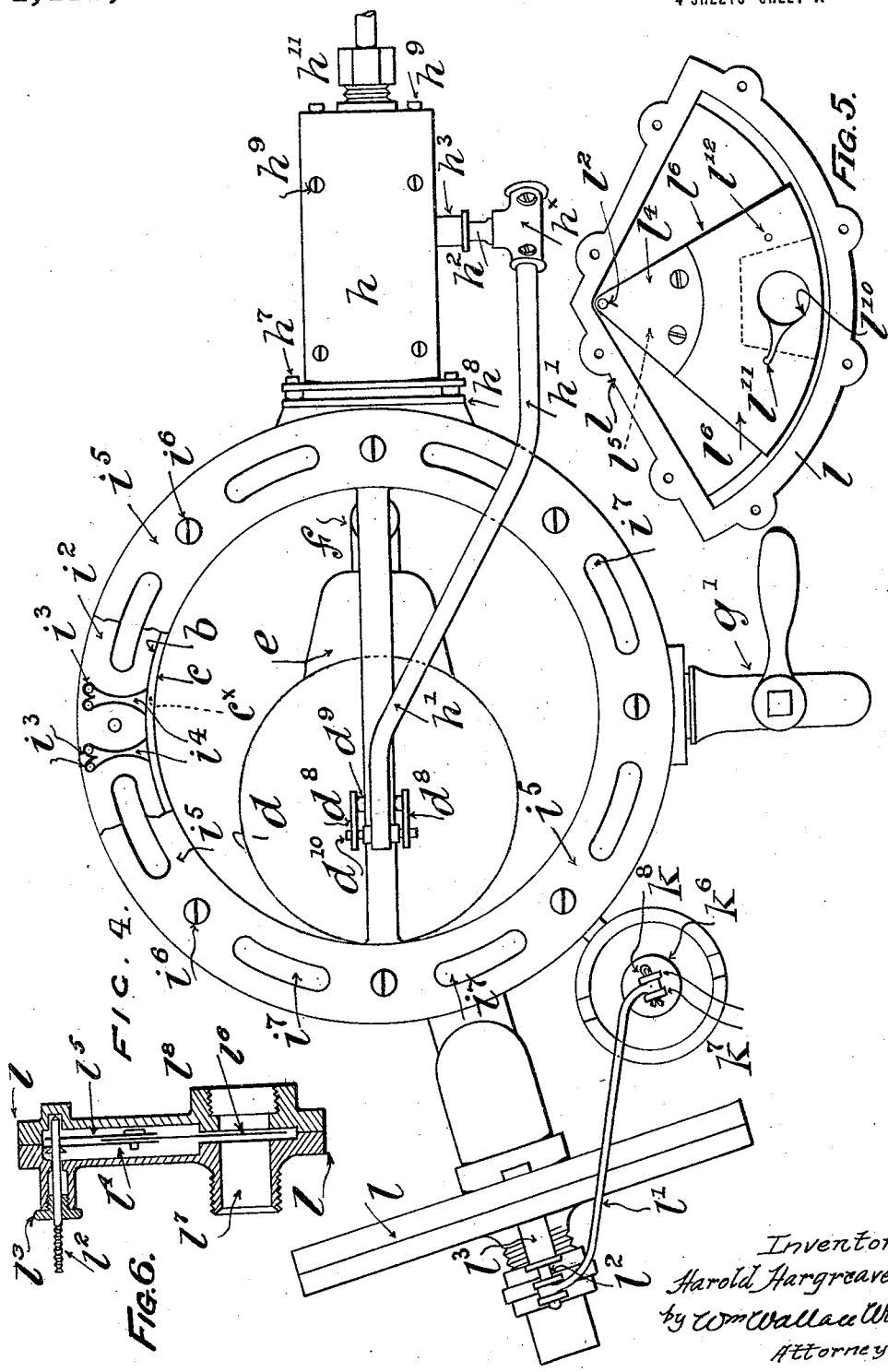

HAROLD HARGREAVES, OF BURNLEY, ENGLAND.

WATER HEATER.

1,415,343.  Specification of Letters Patent.  Patented May 9, 1922.

Application filed July 29, 1920. Serial No. 399,659.

*To all whom it may concern:*

Be it known that I, HAROLD HARGREAVES, a subject of the King of Great Britain and Ireland, residing at 45 Hollingreave Road, Burnley, in the county of Lancaster, England, have invented new and useful Improvements in Water Heaters, of which the following is a specification.

This invention relates to a water heater for use in cafés, restaurants, or other places where a plentiful and more or less continuous supply of boiling water is a desideratum.

My improved water heater possesses the following advantages, following upon the construction hereafter fully described.

Only boiling water or water which has been boiled can be drawn off, whilst owing to the small quantity of water present at any one time in the boiling chamber a supply of boiling water is quickly obtainable. The boiling water is contained in a metal chamber which is thoroughly enclosed and as it were jacketed. Automatic regulation of the flow of water according to the speed of boiling is obtained, as well as automatic regulation of the gas whereby the gas supply is under perfect control even in the event of a failure of water supply. The construction permits ready access to or removal of the casings or vessels in which the water is boiled. A further feature is the isolation or insulation of the water valve box.

The drawings illustrate a construction of water heater embodying the features of my invention.

In the said drawings:

Fig. 1 is a front elevation of the water heater.

Fig. 2 shows a vertical section.

Fig. 2$^a$ is a detail of the water valve and its seat.

Fig. 3 shows a side elevation partly in section.

Fig. 4 is a plan view.

Figs. 5 and 6 are separate detail front view and sectional view of the gas valve casing, gas valve, etc.

In the first three figures, the vertical length of the heater is purposely shortened for lack of room on the sheets.

In the construction illustrated by the drawings, I use a gas ring or burner $a$ supplied with gas and controlled in manner such as is hereafter described and the gas flame imparts heat to a cylindrical casing or vessel $b$. Inside the casing or vessel $b$ is fitted a second cylindrical casing $c$ in such manner as to leave an annular intermediate space marked $c^x$, and this second cylindrical casing is fashioned with a float chamber $d$, a more or less upright connecting pipe $e$, and an over-flow or puff pipe $f$. Water occupies $c^x$, $d$, $e$, and $f$ to a sufficient extent. As soon as the boiling point is reached, steam pressure collecting in the float chamber $d$ and the upper part of $c^x$ forces the boiling water upwards through the over-flow or puff pipe $f$, such boiling water falling into and collecting in the central hot water chamber $g$ from which chamber the same can be supplied through the draw-off tap $g'$. When boiling water is forced out at $f$, water is withdrawn from the float chamber $d$ from $c^x$ and so the float $d'$ supported in said float chamber $d$ falls. Said float $d'$ has a rod $d^2$ attached thereto the same working through a metal washer $d^3$ applied to the cover $d^4$ of the float chamber and through a guide aperture $d^5$. A loose metal collar $d^6$ fitting on the rod $d^2$ and resting against the washer $d^3$ may be used to prevent the escape of steam between the rod $d^2$ and washer $d^3$. The reference letter $d^7$ denotes a very small air or vent hole in the cover of the float chamber $d$ to allow the water in $c^x$, $d$, $e$ and $f$ to assume its normal level when such water is not boiling. This hole is small enough to allow only a negligible quantity of steam to pass when the water is boiling, $c^x$, $d$, and $e$ being thus for all practical purposes closed at the top to retain steam pressure.

To the float rod $d^2$ I attach links $d^8$, $d^8$ pivoted upon a pin or stud $d^9$, the other extremities of the links being jointed at the points $d^{10}$, $d^{10}$ to the lever $h'$. This lever has a T piece $h^x$ attached to it, by screws or otherwise, such T piece having a spindle $h^2$ fashioned along with it and working through a gland $h^3$. The spindle $h^2$ finds a bearing in the opposite side of the water valve box $h$ and has a cam $h^4$ fixed thereon which cam actuates a valve $h^5$ to force such valve to or remove same from its seat $h^6$ in similar manner to a ball valve or like water valve arrangement. The water valve box $h$ is secured by screws $h^7$ to a plate $h^8$ soldered on the outer casing, small non-conducting washers being interposed to prevent heat passing. In order to remove the valve washer in the water valve box $h$ the box cover can be lifted away by removing the screws $h^9$.

Should the float $d'$ fall, feed water is admitted into the valve box $h$ because the valve $h^5$ is moved from its seat, the water passing down the tube $h^{10}$ and through the bend $h^{13}$ to the space between the two cylindrical sleeves $i, j$ which form a double outer casing surrounding the heater. The object of the bend $h^{13}$ is to prevent hot water rising from the outer casing into the valve box $h$. The outer casing, as shown, is built-up from two cylindrical sleeves $i, j$ so as to produce a water space between same, the two elements being soldered or otherwise secured together at the point $i'$. Such two cylindrical sleeves $i, j$ are also soldered to the lower face of the metal flange $i^2$. Holes $i^3$ are drilled in said flange $i^2$ to establish communication from the water in the outer casing $j^x$, and channels $i^4$ are formed in the upper face of the flange $i^2$ so that water can flow through the holes $i^3$ across the channels $i^4$ and into the water space $c^x$ between the vessels $b, c$. This is clearly shown particularly in Figs. 2 and 4.

The vessel $b$ is soldered to the inside edge of the lower flange $i^2$ whilst the vessel $c$ is soldered or secured to the inside edge of the upper flange $i^5$. The two flanges $i^2$, $i^5$ are faced and connected together by the screws $i^6$. Slots $i^7$ are cut through both flanges $i^2$, $i^5$ to allow waste gases to escape.

In connection with the water space $c^x$ between the vessels $b$, and $c$, is a pipe $k^x$ leading to the cylindrical casing $k$ which is shown in section in Fig. 3, and such casing contains two floats $k'$, $k^2$. Fixed to float $k'$ is a float spindle $k^3$ which is guided by an aperture in the dished plate $k^4$, and, by an aperture $k^5$ in the bottom of the cylindrical casing $k$.

When the water level in the cylindrical casing $k$ is normal, the float $k'$ presses itself against the dished plate $k^4$. Resting on and pressing against the float spindle $k^3$, is a circular plate $k^6$ which is carried by the links $k^7$ pivoted at the point $k^8$ to the lever $l'$. The float $k^2$ has a tube $k^9$ running axially through it, allowing the float spindle $k^3$ to work therethrough and independent of the second float $k^2$.

When the level of the water in the hot water container $g$ rises above the discharge or puff pipe $f$, the second float $k^2$ rises too. To the top of such second float $k^2$ is fixed a dished ring or actuator $k^{10}$ of a design to co-operate with circular plate $k^6$ and so as to keep the latter in a central or mid-position. Respecting the gas valve casing $l$, the lever $l'$ is fixed to the spindle $l^2$ and works through a gland $l^3$ formed on the gas valve casing $l$. Such gas valve casing is made in two parts secured together by screws (see Figs. 3, 5 and 6). The spindle $l^2$ carries two sheet metal segments $l^4$ $l^5$ between which is clamped a sheet of paper $l^6$ or other suitable material, the clamping being effected by the action of screws. The paper is cut to the contour shown in Fig. 5.

Upon the gas valve casing $l$ is formed a union connection $l^7$ for the gas inlet pipe, whilst an elbow attachment is screwed on at $l^8$ for attaching the pipe $l^9$ which feeds the gas to the burner $a$ under control of the ordinary taps. If Fig. 6 be examined, it will be noticed that just sufficient space is left between the meeting faces of the gas valve casing $l$ for the paper $l^6$ to move freely. Gas passage ways are drilled through the flat meeting face of the gas valve casing $l$ and a similar hole $l^{10}$ is cut in the paper $l^6$, and, when these holes coincide, the gas is full on and flows through the full passage ways.

A narrow slot $l^{11}$ cut in the paper $l$ leads from the aperture $l^{10}$ and is for the purpose of regulating the gas to just the quantity required to keep the heater at boiling point when full of water. A small hole $l^{12}$ is also cut in the paper to allow a small quantity of gas to pass for a pilot light when the gas is shut down owing to failure of water supply.

When the water level between the cylindrical casings $b$ $c$ is normal, the full gas aperture $l^{10}$ occupies a position to put the gas full on, but, should the water level fall below the pipe connection $k'$, the water from the float casing $k$ runs out, and so the float $k'$ falls. This action removes the float spindles $k^3$ from below the circular plate $k^6$, which then falls, and pulls down the lever $l'$ moving the aperture $l^{10}$ out of register in the gas valve casing, thus preventing the free flow of gas save through the pilot hole $l^{12}$.

As soon as the level of water is restored so that same flows into the float casing $k$ normal conditions are again restored.

Should the level of the water in the float casing $k$ rise above the level of the overflow or puff pipe $f$, then the second float $k^2$ rises and acts on the circular plate $k^6$ and lever $l'$ thus moving the full aperture $l^{10}$ out of register and only allowing gas to pass through the slot $l^{11}$. Thus, as the second float $k^2$ rises, the gas is throttled more and more until only a sufficient quantity is passed to keep the water at boiling point so long as the second float remains elevated. When water is drawn off, the second float $k^2$ falls and allows the free flow of gas.

A small pilot burner $m$ may be provided, as shown in Figs. 1 and 3, which will keep the water at boiling point when the large burner is turned off.

By using such a small pilot burner, the boiling water chamber $g$ can be emptied of water whereas if only the large burner was used the chamber would be continually filled with boiling water which may not be required.

The draw-off tap marked $g'$ is clearly shown in Figs. 1 and 3, and same is carried on a short length of screwed tube $g^2$ which screws into a nut $g^3$ soldered onto the casing $c$. The screwed tube $g^2$ carries two lock nuts $g^4$. When the draw-off tap $g'$ is screwed into place, the washer $g^5$ is tightened between the lock nuts and a collar $g^6$ soldered or fixed on the casing $b$. The vertical position of the draw-off tap $g'$ can be secured by adjustment of the lock nuts $g^4$.

I prefer to use a canopy $n$ fitted to the top of the heater and I may have a flue pipe connected thereto.

By unscrewing the draw-off tap $g'$, and its supporting tube $g^2$, and by removing the screws $l^6$ and disconnecting the lever $h'$ etc., the casing $c$ can be lifted away and the interior of casing $b$ and the exterior of casing $c$ cleaned of deposit. The bottom of the casing $b$ can be easily renewed.

The feed water connections to the water valve box $h'$ is made at $h^{11}$ as indicated in Figs. 1, 2 and 4.

Suitable passage ways or holes such as those marked $d^x$ exist in the float chamber by which communication is rendered possible between $c^x$ and the interior of the float chamber $d$ and between $d$ and pipe $e$ (see Fig. 2). These passageways, however, do not communicate with the chamber $g$, the puff-pipe $f$ being the only communication between $c^x$, $d$, and $e$, as the boiling chamber, and $g$ as the collecting chamber. It will thus be seen that as $c^x$, $d$, and $e$ are closed at the top, steam pressure forces out water from $f$ to $g$, the float $d'$ falls and admits further feed water.

The rod $d^2$ is preferably a tube open at the top to allow escape of any air pressure from the interior of the float $d'$ via the aperture $a^{11}$.

I declare that what I claim is.

1. In a water heater, a heating device, a chamber wherein the water is boiled, and a second independent chamber wherein the boiled water is collected, the boiling water being forced by steam pressure from the boiling chamber to the second independent collecting chamber, and automatic means for feeding water to the boiling chamber.

2. A water heater comprising a heating device, a chamber wherein the water is boiled, a second independent chamber wherein the boiled water is collected from the boiling chamber, a concentric supply chamber and automatic means supplying water to said concentric supply chamber comprising a valve box, a valve therein, and lever and float devices by which the water supply is controlled.

3. A water heater comprising an inside central pan and an outer pan, the outer boiling pan supplying the water when boiled to the inner pan, and a feed water supply external to said two pans and automatic means for feeding water from the external supply to the outer or boiling pan.

4. A water heater consisting of two central pans, a heating device, which heats the outer boiling pan and supplies the water when boiled to the inner pan and an exterior hollow shell lying about the said two pans and from which water is delivered to the boiling pan and automatic means to supply cold water to the exterior hollow shell.

5. A water heater consisting of two central pans, an outer boiling pan, a heating device to heat such boiling pan, an inner pan, said outer pan supplying the water when boiled to said inner pan, an exterior shell adapted to receive feed water and to deliver same to the said boiling pan and an automatic feed water control delivering to the exterior shell and comprising a valve device, lever connections and float controlled by water acting on said float as set forth.

6. A water heater having two central chambers, an outer boiling chamber, and an independent collecting chamber, the boiled water being delivered from the outer to the collecting chamber automatic water supply means for controlling the water supply, and automatic means for throttling the fuel supply when the collecting chamber is nearly full of water, said automatic throttling means comprising a disc valve, lever connections, and a float combination as set forth.

7. A water heater having two central pans the outer being a boiling pan and the inner a collecting pan, an exterior water jacket device, an automatic water supply combination feeding the exterior water jacket device, a gas heating appliance in connection with the boiling pan, and automatic means which regulate the supply of gas to said gas heating appliance.

8. In combination in a water heater two concentric pans, comprising an outer boiling pan, and an inner pan for receiving the water when boiled, an exterior water containing shell feeding the boiling pan, automatic water controlling means comprising a valve device, levers, and float, and a gas heating device to heat the boiling pan and consisting of a control valve, levers and floats as set forth.

9. A water heater consisting of a boiling pan, a pan to receive the water when boiled, an exterior water shell, said pans and shell being concentric, automatic means governing the water supply to the exterior shell comprising a valve, lever, float, and a gas burning device heating the boiling pan and supplied with gas and automatic controlling means governing the gas supply comprising a valve, levers, and floats as herein set forth.

In testimony whereof I have signed my name to this specification.

HAROLD HARGREAVES.